US009013330B2

(12) United States Patent
Nutaro et al.

(10) Patent No.: US 9,013,330 B2
(45) Date of Patent: Apr. 21, 2015

(54) ELECTRIC TAXI SYSTEM GUIDANCE

(75) Inventors: Joe Nutaro, Phoenix, AZ (US); Troy Nichols, Peoria, AZ (US); Keith Hughes, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 555 days.

(21) Appl. No.: 13/223,461

(22) Filed: Sep. 1, 2011

(65) Prior Publication Data

US 2013/0057414 A1 Mar. 7, 2013

(51) Int. Cl.

| | |
|---|---|
| ***G08B 21/00*** | (2006.01) |
| ***G08G 1/123*** | (2006.01) |
| ***G06F 19/00*** | (2011.01) |
| ***G06G 7/76*** | (2006.01) |
| ***G06F 3/048*** | (2013.01) |
| ***G08G 5/06*** | (2006.01) |
| ***G08G 5/00*** | (2006.01) |

(52) U.S. Cl.
CPC .............. *G08G 5/065* (2013.01); *G08G 5/0021* (2013.01)

(58) Field of Classification Search
USPC .......................................................... 340/958
See application file for complete search history.

(56) References Cited

U.S. PATENT DOCUMENTS

| | | | | |
|---|---|---|---|---|
| 3,706,969 | A | 12/1972 | Paredes | |
| 3,807,664 | A | 4/1974 | Kelly, Jr. et al. | |
| 4,659,039 | A | 4/1987 | Valdes | |
| 5,078,340 | A | 1/1992 | Anderberg | |
| 6,411,890 | B1 | 6/2002 | Zimmerman | |
| 6,553,307 | B2 | 4/2003 | Stratton et al. | |
| 6,571,166 | B1 * | 5/2003 | Johnson et al. | 701/120 |
| 6,731,226 | B2 | 5/2004 | Walter | |

(Continued)

FOREIGN PATENT DOCUMENTS

| | | | |
|---|---|---|---|
| GB | 2471213 | A | 12/2010 |
| WO | 2007027588 | A1 | 3/2007 |

OTHER PUBLICATIONS

Distributed and redundant electro-mechanical nose wheel steering system, Dress Paris, DRESS early achievements presentation—Paris Air Show 2009.

(Continued)

*Primary Examiner* — Jennifer Mehmood
*Assistant Examiner* — John Mortell
(74) *Attorney, Agent, or Firm* — Ingrassia Fisher & Lorenz, P.C.

(57) ABSTRACT

A taxi guidance system is provided for an aircraft having a primary thrust engine and an onboard electric taxi system. The taxi guidance system includes or cooperates with a source of aircraft status data for the aircraft, and a source of airport feature data associated with synthetic graphical representations of an airport field. The taxi guidance system includes a processor operatively coupled to the source of aircraft status data and to the source of airport feature data to generate, in response to at least the aircraft status data and the airport feature data, taxi path guidance information for the aircraft, start/stop guidance information associated with operation of the primary thrust engine, and speed guidance information for the onboard electric taxi system. The processor generates image rendering display commands that can be received by a display system to render a dynamic synthetic representation of the airport field that includes graphical indicia of the taxi path guidance information, the start/stop guidance information, and the speed guidance information.

18 Claims, 4 Drawing Sheets

(56) References Cited

U.S. PATENT DOCUMENTS

| | | | | |
|---|---|---|---|---|
| 6,751,545 | B2 * | 6/2004 | Walter | 701/120 |
| 6,945,354 | B2 | 9/2005 | Goff | |
| 7,039,518 | B2 * | 5/2006 | Ingram et al. | 701/103 |
| 7,148,814 | B2 * | 12/2006 | Sikora et al. | 340/945 |
| 7,222,017 | B2 | 5/2007 | Clark et al. | |
| 7,226,018 | B2 | 6/2007 | Sullivan | |
| 7,237,748 | B2 | 7/2007 | Sullivan | |
| 7,382,284 | B1 | 6/2008 | Armstrong et al. | |
| 7,445,178 | B2 | 11/2008 | McCoskey et al. | |
| 7,564,372 | B1 | 7/2009 | Bailey et al. | |
| 7,592,929 | B2 | 9/2009 | Pepitone | |
| 7,594,626 | B2 | 9/2009 | Soderberg | |
| 7,703,717 | B2 | 4/2010 | Soderberg | |
| 7,731,122 | B2 | 6/2010 | Frank | |
| 7,737,867 | B2 | 6/2010 | Arthur et al. | |
| 7,813,845 | B2 | 10/2010 | Doose et al. | |
| 7,817,065 | B2 | 10/2010 | Fetzmann et al. | |
| 7,974,773 | B1 | 7/2011 | Krenz et al. | |
| 7,975,959 | B2 | 7/2011 | Perry et al. | |
| 7,975,960 | B2 | 7/2011 | Cox et al. | |
| 7,983,804 | B2 | 7/2011 | Cox et al. | |
| 8,024,078 | B2 * | 9/2011 | Coulmeau et al. | 701/3 |
| 8,140,257 | B2 | 3/2012 | Villaume et al. | |
| 8,403,259 | B2 | 3/2013 | Charuel et al. | |
| 2003/0102987 | A1 | 6/2003 | Walter | |
| 2004/0059497 | A1 | 3/2004 | Sankrithi | |
| 2006/0065779 | A1 | 3/2006 | McCoskey et al. | |
| 2007/0158497 | A1 | 7/2007 | Edelson et al. | |
| 2007/0282491 | A1 | 12/2007 | Cox et al. | |
| 2008/0109163 | A1 | 5/2008 | Stone et al. | |
| 2008/0179146 | A1 | 7/2008 | Sullivan | |
| 2008/0191903 | A1 | 8/2008 | Dubourg et al. | |
| 2009/0045982 | A1 | 2/2009 | Caillaud et al. | |
| 2009/0150008 | A1 | 6/2009 | Villaume et al. | |
| 2009/0218440 | A1 | 9/2009 | Dilmaghani et al. | |
| 2009/0261197 | A1 | 10/2009 | Cox et al. | |
| 2010/0006699 | A1 | 1/2010 | Sullivan | |
| 2010/0063716 | A1 * | 3/2010 | Brozat | 701/120 |
| 2010/0114491 | A1 | 5/2010 | Maily | |
| 2010/0114922 | A1 | 5/2010 | Gayraud et al. | |
| 2010/0198489 | A1 | 8/2010 | Rozovski et al. | |
| 2010/0204909 | A1 * | 8/2010 | Gayraud et al. | 701/120 |
| 2010/0241291 | A1 | 9/2010 | Konya | |
| 2011/0046868 | A1 | 2/2011 | Michel et al. | |
| 2011/0133545 | A1 | 6/2011 | Pearson et al. | |
| 2011/0198439 | A1 | 8/2011 | Rotger et al. | |
| 2011/0233328 | A1 | 9/2011 | Alleau et al. | |
| 2011/0290933 | A1 | 12/2011 | Cros et al. | |
| 2011/0297786 | A1 | 12/2011 | Sweet et al. | |
| 2011/0313597 | A1 * | 12/2011 | Wilson et al. | 701/3 |
| 2011/0313645 | A1 * | 12/2011 | Shukla | 701/120 |
| 2013/0057414 | A1 | 3/2013 | Nutaro et al. | |
| 2013/0131888 | A1 | 5/2013 | Nutaro et al. | |

OTHER PUBLICATIONS

Ropp Management, Automated NextGen Taxi System, Purdue University, 2010.

Delos Aerospace Developing Wheel Motor Landing Gear System for Aircraft, Delos, May 17, 2010.

Dignan; Honeywell, Safran eye green airplane taxiing, Honeywell-Safran, Jun. 19, 2011.

Learmount; Airliners to auto-taxi through fog, Messier-Bugatti and Messier-Dowty, Jul. 4, 2006.

Thomas; Airbus taxi trials, Airbus, Jul. 15, 2011.

Lufthansa technik, Joint demonstration of new electric taxi system, Aug. 12, 2011.

Cho et al.; Fully automatic taxiing, Takeoff and landing of a UAV only with a single-antenna GPS receiver, GNSS Lab, School of Mechanical & Aerospace Eng., Seoul Natl. Univer., May 2, 2007.

Farnborough; Messier-Bugatti plans demonstration of electric taxi concept, Messier-Bugatti, Jul. 19, 2010.

Kulcsar; Distributed and redundant electrmechanical nose wheel sterring system (DRESS), Budapest University, Jun. 5, 2006.

Kobayashi; Decrease in ground-run distance of airplanes by applying electrically driven wheels, Japan Aerospace Exploration Agency, Jun. 15, 2010.

Ramsey; Ricardo develops airplane taxi bot to reduce emissions, noise, Nov. 21, 2009.

Katz; Evaluation of a prototype advanced taxiway guidance system (ATGS), USDOT, Feb. 2000.

EP Office Action dated Mar. 12, 2013 for application No. 12 182 097.1.

Kim, J.Y., et al., ANTS—Automated NextGen Taxi System; Dec. 31, 2010; FAA Design Competition 2009-2010; URL: http://emerald.ts.odu.edu/Apps/FAAUDCA.nsf/Ropp%20Management.pdf?OpenFileResource, retrieved from the Internet on Jun. 26, 2013.

EP Search Report dated Aug. 21, 2013 for application No. 13 163 438.8.

USPTO Notice of Allowance, Notification Date Oct. 22, 2014; U.S. Appl. No. 13/655,407.

USPTO Office Action for U.S. Appl. No. 13/655,407 dated Jul. 11, 2014.

EP Search Report dated Feb. 28, 2013 for application No. EP 12 182 097.1.

EP Office Action dated Sep. 6, 2013 for application No. 13 163 438.8.

* cited by examiner

ELECTRIC TAXI SYSTEM GUIDANCE

TECHNICAL FIELD

Embodiments of the subject matter described herein relate generally to avionics systems such as electric taxi systems. More particularly, embodiments of the subject matter relate to a system that generates displayable guidance information for an electric taxi system.

BACKGROUND

Modern flight deck displays for vehicles (such as aircraft or spacecraft) display a considerable amount of information, such as vehicle position, speed, altitude, attitude, navigation, target, and terrain information. In the case of an aircraft, most modern displays additionally display a flight plan from different views, either a lateral view, a vertical view, or a perspective view, which can be displayed individually or simultaneously on the same display. Synthetic vision or simulated displays for aircraft applications are also being considered for certain scenarios, such as low visibility conditions. The primary perspective view used in synthetic vision systems emulates a forward-looking cockpit viewpoint. Such a view is intuitive and provides helpful visual information to the pilot and crew, especially during airport approaches and taxiing. In this regard, synthetic display systems for aircraft are beginning to employ realistic simulations of airports that include details such as runways, taxiways, buildings, etc. Moreover, many synthetic vision systems attempt to reproduce the real-world appearance of an airport field, including items such as light fixtures, taxiway signs, and runway signs. Flight deck display systems can be used to present taxi guidance information to the flight crew during taxi operations. For example, a synthetic flight deck display system can be used to show the desired taxi pathway to or from a terminal gate, along with a synthetic view of the airport.

Traditional aircraft taxi systems utilize the primary thrust engines (running at idle) and the braking system of the aircraft to regulate the speed of the aircraft during taxi. Such use of the primary thrust engines, however, is inefficient and wastes fuel. For this reason, electric taxi systems (i.e., traction drive systems that employ electric motors) have been developed for use with aircraft. Electric taxi systems are more efficient than traditional engine-based taxi systems because they can be powered by an auxiliary power unit (APU) of the aircraft rather than the primary thrust engines.

Accordingly, it is desirable to have a guidance system for an electric taxi system of an aircraft. In addition, it is desirable to have a guidance system capable of displaying information that is intended to conserve fuel, extend the operating life of the aircraft brake system, and the like. Furthermore, other desirable features and characteristics will become apparent from the subsequent detailed description and the appended claims, taken in conjunction with the accompanying drawings and the foregoing technical field and background.

BRIEF SUMMARY

A taxi guidance method for an aircraft having a primary thrust engine and an onboard electric taxi system is provided. The method involves obtaining aircraft status data for the aircraft, accessing airport feature data associated with an airport field, and generating, in response to at least the aircraft status data and the airport feature data, taxi path guidance information for the aircraft. The method continues by generating, in response to at least the aircraft status data and the airport feature data, start/stop guidance information for use during taxi, the start/stop guidance information associated with operation of the primary thrust engine, the onboard electric taxi system, or both. The method also generates, in response to at least the aircraft status data and the airport feature data, speed guidance information for the onboard electric taxi system. The method continues by presenting the taxi path guidance information, the start/stop guidance information, and the speed guidance information to a user.

Also provided is a method of displaying taxi guidance indicia for an aircraft having a primary thrust engine and an onboard electric taxi system. The method obtains aircraft status data including geographic position data and heading data for the aircraft, and accesses airport feature data associated with synthetic graphical representations of an airport field. The method continues by generating, in response to at least the aircraft status data and the airport feature data, taxi path guidance information for the aircraft, start/stop guidance information associated with operation of the primary thrust engine, and speed guidance information for the onboard electric taxi system. The method continues by rendering a dynamic synthetic representation of the airport field on a display element, the dynamic synthetic representation being rendered in accordance with the geographic position data, the heading data, and the airport feature data, wherein the dynamic synthetic representation of the airport field comprises graphical indicia of the taxi path guidance information, the start/stop guidance information, and the speed guidance information.

A taxi guidance system for an aircraft having a primary thrust engine and an onboard electric taxi system is also provided. The system includes: a source of aircraft status data for the aircraft; a source of airport feature data associated with synthetic graphical representations of an airport field; and a processor operatively coupled to the source of aircraft status data and to the source of airport feature data. The processor is configured to generate, in response to at least the aircraft status data and the airport feature data, taxi path guidance information for the aircraft, start/stop guidance information associated with operation of the primary thrust engine, and speed guidance information for the onboard electric taxi system, and to generate image rendering display commands. The system also includes a display element that receives the image rendering display commands and, in response thereto, renders a dynamic synthetic representation of the airport field that includes graphical indicia of the taxi path guidance information, the start/stop guidance information, and the speed guidance information.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The system and methods described herein can be deployed with any vehicle that may be subjected to taxi operations, such as aircraft. The exemplary embodiment described herein assumes that the aircraft includes an electric taxi system, which utilizes one or more electric motors as a traction system to drive the wheels of the aircraft during taxi operations. The system and methods presented here provide guidance information to the flight crew for purposes of optimizing or otherwise enhancing the operation of the electric taxi system. Such optimization may be based on one or more factors such as, without limitation: fuel conservation; prolonging the useful life of the brake system; and reducing taxi time. In certain embodiments, the taxi guidance information is rendered with a dynamic synthetic display of the airport field to provide visual guidance to the flight crew. The taxi guidance information may include a desired taxi route or path, a target speed for the electric taxi system to maintain, a graphical indicator or message that identifies the best time to turn the primary thrust engine(s) on or off, or the like. The display system may be implemented as an onboard flight deck system, as a portable computer, as an electronic flight bag, or any combination thereof.

Figure 1:
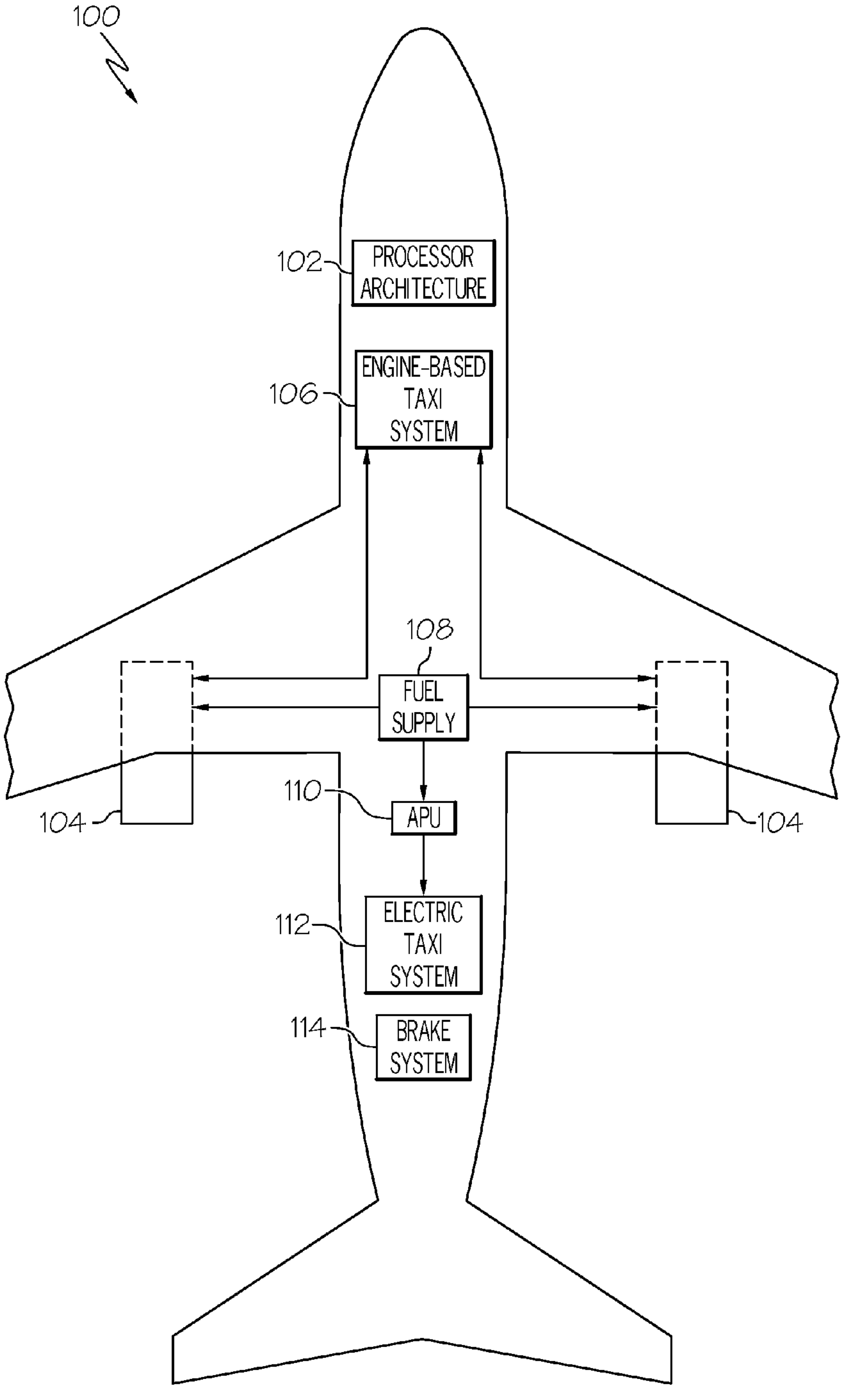
FIG. 1 is a simplified schematic representation of an aircraft having an electric taxi system.

FIG. 1 is a simplified schematic representation of an aircraft 100. For the sake of clarity and brevity, FIG. 1 does not depict the vast number of systems and subsystems that would appear onboard a practical implementation of the aircraft 100. Instead, FIG. 1 merely depicts some of the notable functional elements and components of the aircraft 100 that support the various features, functions, and operations described in more detail below. In this regard, the aircraft 100 may include, without limitation: a processor architecture 102; one or more primary thrust engines 104; an engine-based taxi system 106; a fuel supply 108; an auxiliary power unit (APU) 110; an electric taxi system 112; and a brake system 114. These elements, components, and systems may be coupled together as needed to support their cooperative functionality.

The processor architecture 102 may be implemented or realized with at least one general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. As described in more detail below, the processor architecture 102 is configured to support various electric taxi guidance processes, operations, and display functions.

In practice, the processor architecture 102 may be realized as an onboard component of the aircraft 100 (e.g., a flight deck control system, a flight management system, or the like), or it may be realized in a portable computing device that is carried onboard the aircraft 100. For example, the processor architecture 102 could be realized as the central processing unit (CPU) of a laptop computer, a tablet computer, or a handheld device. As another example, the processor architecture 102 could be implemented as the CPU of an electronic flight bag carried by a member of the flight crew or mounted permanently in the aircraft. Electronic flight bags and their operation are explained in documentation available from the United States Federal Aviation Administration (FAA), such as FAA document AC 120-76A.

The processor architecture 102 may include or cooperate with an appropriate amount of memory (not shown), which can be realized as RAM memory, flash memory, EPROM memory, EEPROM memory, registers, a hard disk, a removable disk, a CD-ROM, or any other form of storage medium known in the art. In this regard, the memory can be coupled to the processor architecture 102 such that the processor architecture 102 can read information from, and write information to, the memory. In the alternative, the memory may be integral to the processor architecture 102. In practice, a functional or logical module/component of the system described here might be realized using program code that is maintained in the memory. Moreover, the memory can be used to store data utilized to support the operation of the system, as will become apparent from the following description.

The illustrated embodiment of the aircraft includes at least two primary thrust engines 104, which may be fed by the fuel supply 108. The engines 104 serve as the primary sources of thrust during flight. The engines 104 may also function to provide a relatively low amount of thrust (e.g., at idle) to support a conventional engine-based taxi system 106. When running at idle, the engines 104 typically provide a fixed amount of thrust to propel the aircraft 100 for taxi maneuvers. When the engines 104 are utilized for taxi operations, the speed of the aircraft is regulated by the brake system 114.

Exemplary embodiments of the aircraft 100 also include the electric taxi system 112 (which may be in addition to or in lieu of the engine-based taxi system 106). In certain implementations, the electric taxi system 112 includes at least one electric motor (not shown in FIG. 1) that serves as the traction system for the drive wheels of the aircraft 100. The electric motor may be powered by the APU 110 onboard the aircraft 100, which in turn is fed by the fuel supply 108. As described in more detail below, the electric taxi system 112 can be controlled by a member of the flight crew to achieve a desired taxi speed. Unlike the traditional engine-based taxi system 106, the electric taxi system 112 can be controlled to regulate the speed of the drive wheels without requiring constant or frequent actuation of the brake system 114 (this is similar to how an electric or hybrid automobile operates). The aircraft 100 may employ any suitably configured electric taxi system 112, which employs electric motors to power the wheels of the aircraft during taxi operations.

Figure 2:
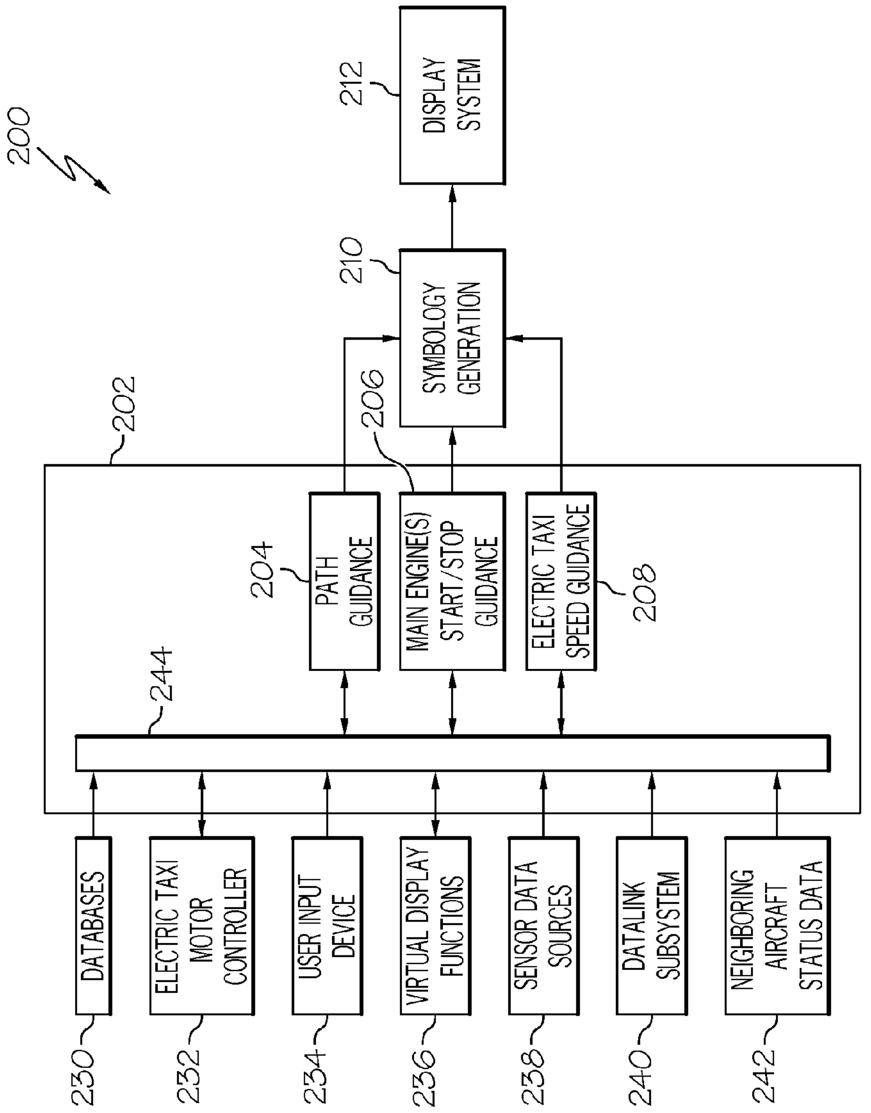
FIG. 2 is a schematic representation of an exemplary embodiment of a tax guidance system suitable for use with an aircraft.

FIG. 2 is a schematic representation of an exemplary embodiment of a taxi guidance system 200 suitable for use with the aircraft 100. Depending upon the particular embodiment, the taxi guidance system 200 may be realized in conjunction with a ground management system 202, which in turn may be implemented in a line replaceable unit (LRU) for the aircraft 100, in an onboard subsystem such as the flight deck display system, in an electronic flight bag, in an integrated modular avionics (IMA) system, or the like. The illustrated embodiment of the taxi guidance system 200 generally includes, without limitation: a path guidance module 204; an engine start/stop guidance module 206; an electric taxi speed guidance module 208; a symbology generation module 210; and a display system 212. The taxi guidance system 200 may also include or cooperate with one or more of the following elements, systems, components, or modules: databases 230; a controller 232 for the electric taxi system motor; at least one user input device 234; a virtual (synthetic) display module 236; sensor data sources 238; a datalink subsystem 240; and a source of neighboring aircraft status data 242. In practice, various functional or logical modules of the taxi guidance system 200 may be implemented with the processor architecture 102 (and associated memory) described above with reference to FIG. 1. The taxi guidance system 200 may employ any appropriate communication architecture 244 or arrangement that facilitates inter-function data communication, transmission of control and command signals, provision of operating power, transmission of sensor signals, etc.

The taxi guidance system 200 is suitably configured such that the path guidance module 204, the engine start/stop guidance module 206, and/or the electric taxi speed guidance module 208 are responsive to or are otherwise influenced by a variety of inputs. For this particular embodiment, the influencing inputs are obtained from one or more of the sources and components listed above (i.e., the items depicted at the left side of FIG. 2). The outputs of the path guidance module 204, the engine start/stop guidance module 206, and/or the electric taxi speed guidance module 208 are provided to the symbology generation module 210, which generates corresponding graphical representations suitable for rendering with a synthetic display of an airport field. The symbology generation module 210 cooperates with the display system 212 to present taxi guidance information to the user.

The databases 230 represent sources of data and information that may be used to generate taxi guidance information. For example the databases 230 may store any of the following, without limitation: airport location data; airport feature data, which may include layout data, coordinate data, data related to the location and orientation of gates, runways, taxiways, etc.; airport restriction or limitation data; aircraft configuration data; aircraft model information; engine cool down parameters, such as cool down time period; engine warm up parameters, such as warm up time period; electric taxi system specifications; and the like. In certain embodiments, the databases 230 store airport feature data that is associated with (or can be used to generate) synthetic graphical representations of a departure or destination airport field. The databases 230 may be updated as needed to reflect the specific aircraft, the current flight plan, the departing and destination airports, and the like.

The controller 232 represents the control logic and hardware for the electric taxi motor. In this regard, the controller 232 may include one or more user interface elements that enable the pilot to activate, deactivate, and regulate the operation of the electric taxi system as needed. The controller 232 may also be configured to provide information related to the status of the electric taxi system, such as operating condition, wheel speed, motor speed, and the like.

The user input device 234 may be realized as a user interface that receives input from a user (e.g., a pilot) and, in response to the user input, supplies appropriate command signals to the taxi guidance system 200. The user interface may be any one, or any combination, of various known user interface devices or technologies, including, but not limited to: a cursor control device such as a mouse, a trackball, or joystick; a keyboard; buttons; switches; or knobs. Moreover, the user interface may cooperate with the display system 212 to provide a touch screen interface. The user input device 234 may be utilized to acquire various user-selected or user-entered data, which in turn influences the electric taxi guidance information generated by the taxi guidance system 200. For example, the user input device 234 could obtain any of the following, without limitation: a selected gate or terminal at an airport; a selected runway; user-entered taxiway directions; user-entered airport traffic conditions; user-entered weather conditions; runway attributes; and user options or preferences.

The virtual display module 236 may include a software application and/or processing logic to generate dynamic synthetic displays of airport fields during taxi operations. The virtual display module 236 may also be configured to generate dynamic synthetic displays of a cockpit view during flight. In practice, the virtual display module 236 cooperates with the symbology generation module 210 and the display system 212 to render graphical indicia of electric taxi guidance information, as described in more detail below.

The sensor data sources 238 represents various sensor elements, detectors, diagnostic components, and their associated subsystems onboard the aircraft. In this regard, the sensor data sources 238 function as sources of aircraft status data for the host aircraft. In practice, the taxi guidance system 200 could consider any type or amount of aircraft status data including, without limitation, data indicative of: tire pressure; nose wheel angle; brake temperature; brake system status; outside temperature; ground temperature; engine thrust status; primary engine on/off status; aircraft ground speed; geographic position of the aircraft; wheel speed; electric taxi motor speed; electric taxi motor on/off status; or the like.

The datalink subsystem 240 is utilized to provide air traffic control data to the host aircraft, preferably in compliance with known standards and specifications. Using the datalink subsystem 240, the taxi guidance system 200 can receive air traffic control data from ground based air traffic controller stations and equipment. In turn, the system 200 can utilize such air traffic control data as needed. For example, taxi maneuver clearance and other airport navigation instructions may be provided by an air traffic controller using the datalink subsystem 240.

In an exemplary embodiment, the host aircraft supports data communication with one or more remote systems. More specifically, the host aircraft receives status data for neighboring aircraft using, for example, an aircraft-to-aircraft data communication module (i.e., the source of neighboring aircraft status data 242). For example, the source of neighboring aircraft status data 242 may be configured for compatibility with Automatic Dependant Surveillance-Broadcast (ADS-B) technology, with Traffic and Collision Avoidance System (TCAS) technology, and/or with similar technologies.

The path guidance module 204, the engine start/stop guidance module 206, and the electric taxi speed guidance module 208 are suitably configured to respond in a dynamic manner to provide real-time guidance for optimized operation of the electric taxi system. In practice, the taxi guidance information (e.g., taxi path guidance information, start/stop guidance information for the engines, and speed guidance information for the electric taxi system) might be generated in accordance with a fuel conservation specification or guideline for the aircraft, in accordance with an operating life longevity specification or guideline for the brake system 114 (see FIG. 1), and/or in accordance with other optimization factors or parameters. To this end, the path guidance module 204 processes relevant input data and, in response thereto, generates taxi path guidance information related to a desired taxi route to follow. The desired taxi route can then be presented to the flight crew in an appropriate manner. The engine start/stop guidance module 206 processes relevant input data and, in response thereto, generates start/stop guidance information that is associated with operation of the primary thrust engine (s) and/or is associated with operation of the electric taxi system. As explained in more detail below, the start/stop guidance information may be presented to the user in the form of displayed markers or indicators in a synthetic graphical representation of the airport field. The electric taxi speed guidance module 208 processes relevant input data and, in response thereto, generates speed guidance information for the onboard electric taxi system. The speed guidance information may be presented to the user as a dynamic alphanumeric field displayed in the synthetic representation of the airport field.

The symbology generation module 210 can be suitably configured to receive the output of the path guidance module 204, the engine start/stop guidance module 206, and the electric taxi speed guidance module 208, and process the received information in an appropriate manner for incorporation, blending, and integration with the dynamic synthetic representation of the airport field. Thus, the electric taxi guidance information can be merged into the synthetic display to provide enhanced situational awareness and taxi instructions to the pilot in real-time.

The exemplary embodiment described here relies on graphically displayed and rendered taxi guidance information. Accordingly, the display system 212 includes at least one display element. In an exemplary embodiment, the display element cooperates with a suitably configured graphics system (not shown), which may include the symbology generation module 210 as a component thereof. This allows the display system 212 to display, render, or otherwise convey one or more graphical representations, synthetic displays, graphical icons, visual symbology, or images associated with operation of the host aircraft on the display element, as described in greater detail below. In practice, the display element receives image rendering display commands from the display system 212 and, in response to those commands, renders a dynamic synthetic representation of the airport field during taxi operations.

In an exemplary embodiment, the display element is realized as an electronic display configured to graphically display flight information or other data associated with operation of the host aircraft under control of the display system 212. The display system 212 is usually located within a cockpit of the host aircraft. Alternatively (or additionally), the display system 212 could be realized in a portable computer, and electronic flight bag, or the like.

Although the exemplary embodiment described here presents the guidance information in a graphical (displayed) manner, the guidance information could alternatively or additionally be annunciated in an audible manner. For example, in lieu of graphics, the system could provide audible instructions or warnings about when to shut the main engines down, when to turn the main engines one. As another example, the system may utilize indicator lights or other types of feedback instead of a synthetic display of the airport field.

Figure 3:
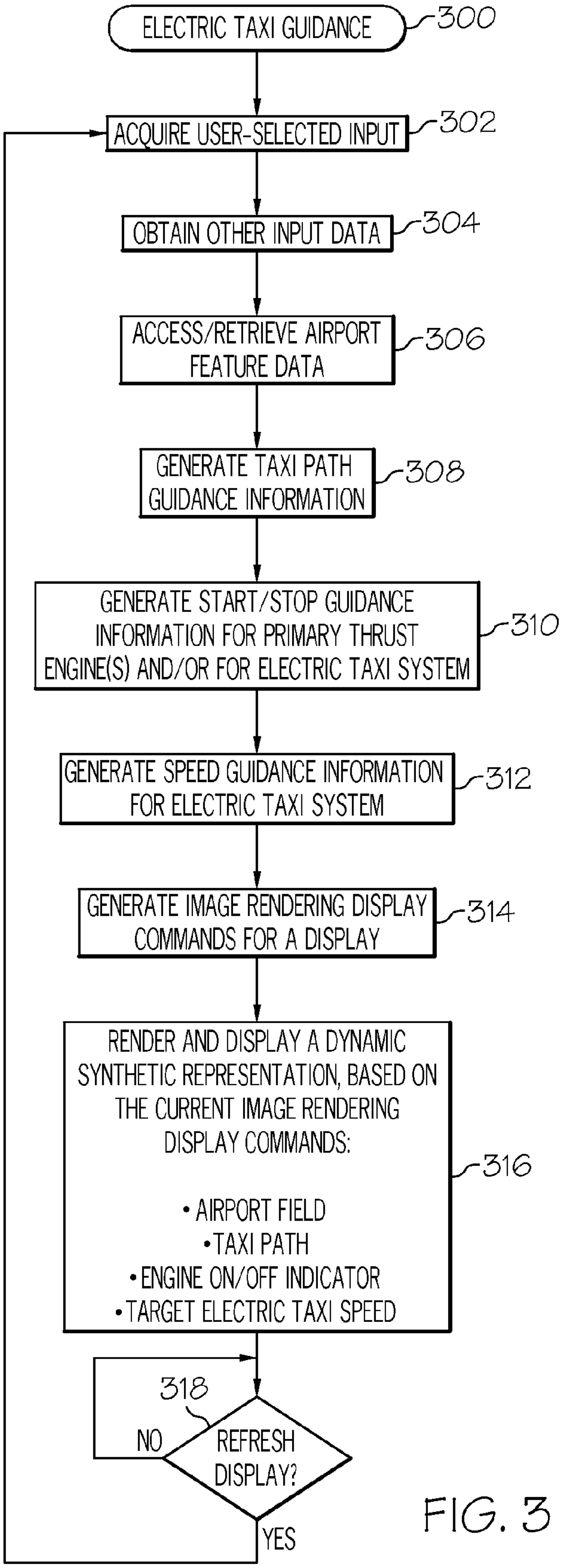
FIG. 3 is a flow chart that illustrates an exemplary embodiment of an electric taxi guidance process.

FIG. 3 is a flow chart that illustrates an exemplary embodiment of an electric taxi guidance process 300. The process 300 may be performed by an appropriate system or component of the host aircraft, such as the taxi guidance system 200. The various tasks performed in connection with the process 300 may be performed by software, hardware, firmware, or any combination thereof. For illustrative purposes, the following description of the process 300 may refer to elements mentioned above in connection with FIG. 1 and FIG. 2. In practice, portions of the process 300 may be performed by different elements of the described system, e.g., the processor architecture 102, the ground management system 202, the symbology generation module 210, or the display system 212. It should be appreciated that the process 300 may include any number of additional or alternative tasks, the tasks shown in FIG. 3 need not be performed in the illustrated order, and the process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

Although the process 300 could be performed or initiated at any time while the host aircraft is operating, this example assumes that the process 300 is performed after the aircraft has landed (or before takeoff). More specifically, the process 300 can be performed while the aircraft is in a taxi mode. The process 300 can be performed in a virtually continuous manner at a relatively high refresh rate. For example, iterations of the process 300 could be performed at a rate of 12-40 Hz (or higher) such that the synthetic flight deck display will be updated in real-time or substantially real time in a dynamic manner.

The process 300 obtains, receives, accesses, or acquires certain data and information that influences the generation and presentation of taxi guidance information. In this regard, the process may acquire certain types of user-selected or user-entered data as input data (task 302). The user input data may include any of the information specified above with referent to the user input device 234 (see FIG. 2). For example, the process 300 may contemplate user-selected or user-identified gates, runways, traffic conditions, or the like. The process 300 may also obtain or receive other input data (task 304) that might influence the generation and presentation of taxi guidance information. Referring again to FIG. 2, the various elements, systems, and components that feed the taxi guidance system 200 may provide the other input data for task 304. In certain embodiments, this input data includes aircraft status data for the host aircraft (such as geographic position data, heading data, and the like) obtained from onboard sensors and detectors. The input data may also include data received from air traffic control via the datalink subsystem 240. In some scenarios, the input data also includes neighboring aircraft status data for at least one neighboring aircraft in the airport field, which allows the taxi guidance system 200 to react to airport traffic that might impact the taxi operations of the host aircraft.

The process 300 accesses or retrieves airport feature data that is associated or otherwise indicative of synthetic graphical representations of the particular airport field (task 306). As explained above, the airport feature data might be maintained onboard the aircraft, and the airport feature data corresponds to, represents, or is indicative of certain visible and displayable features of the airport field of interest. The specific airport features data that will be used to render a given synthetic display will depend upon various factors, including the current geographic position and heading data of the aircraft.

The taxi guidance system can process the user-entered input data, the other input data, and the airport feature data in an appropriate manner to generate taxi path guidance information (task 308) for the host aircraft, start/stop guidance information (task 310) for the primary thrust engine(s) and/or for the electric taxi system, and/or speed guidance information (task 312) for the onboard electric taxi system, at the appropriate time and as needed. The resulting taxi path guidance information, start/stop guidance information, and speed guidance information will therefore be dynamically generated in response to the current input data, real-time operating conditions, the current aircraft position and status, and the like. Moreover, some or all of the generated guidance information may be influenced by the user-selected or user-entered data, by the neighboring aircraft data, or by the air traffic control data.

Although the electric taxi guidance information could be conveyed, presented, or annunciated to the flight crew or pilot in different ways, the exemplary embodiment described here displays graphical representations of the taxi path guidance information, the engine start/stop guidance information, and the speed guidance information. More specifically, the process 300 renders the electric taxi guidance information with the dynamic synthetic display of the airport field. Accordingly, the process 300 may utilize the electric taxi guidance information when generating image rendering display commands corresponding to the desired state of the synthetic display (task 314). The image rendering display commands are then used to control the rendering and display of the dynamic synthetic representation of the airport field on the display element (task 316). For this example, task 316 renders the synthetic display of the airport field in accordance with the current geographic position data of the host aircraft, the current heading data of the host aircraft, and the airport feature data. As explained in more detail below with reference to FIG. 4, the graphical representation of the airport field might include graphical features corresponding to taxiways, runways, taxiway/runway signage, the desired taxi path, and the like. The synthetic display may also include graphical representations of an engine on/off indicator and a target electric taxi speed indicator. In practice, the dynamic synthetic display may also include a synthetic perspective view of terrain near or on the airport field. In certain embodiments, the image rendering display commands may also be used to control the rendering of additional graphical features, such as flight instrumentation symbology, flight data symbology, or the like.

If it is time to refresh the display (query task 318), then the process 300 leads back to task 302 to obtain updated input data. If not, then the current state of the synthetic display is maintained. The relatively high refresh rate of the process 300 results in a relatively seamless and immediate updating of the display. Thus, the process 300 is iteratively repeated to update the graphical representation of the airport field and its features, possibly along with other graphical elements of the synthetic display. Notably, the electric taxi guidance information may also be updated in an ongoing manner to reflect changes to the operating conditions, traffic conditions, air traffic control instructions, and the like. In practice, the process 300 can be repeated indefinitely and at any practical rate to support continuous and dynamic updating and refreshing of the display in real-time or virtually real-time. Frequent updating of the displays enables the flight crew to obtain and respond to the current operating situation in virtually real-time.

Figure 4:
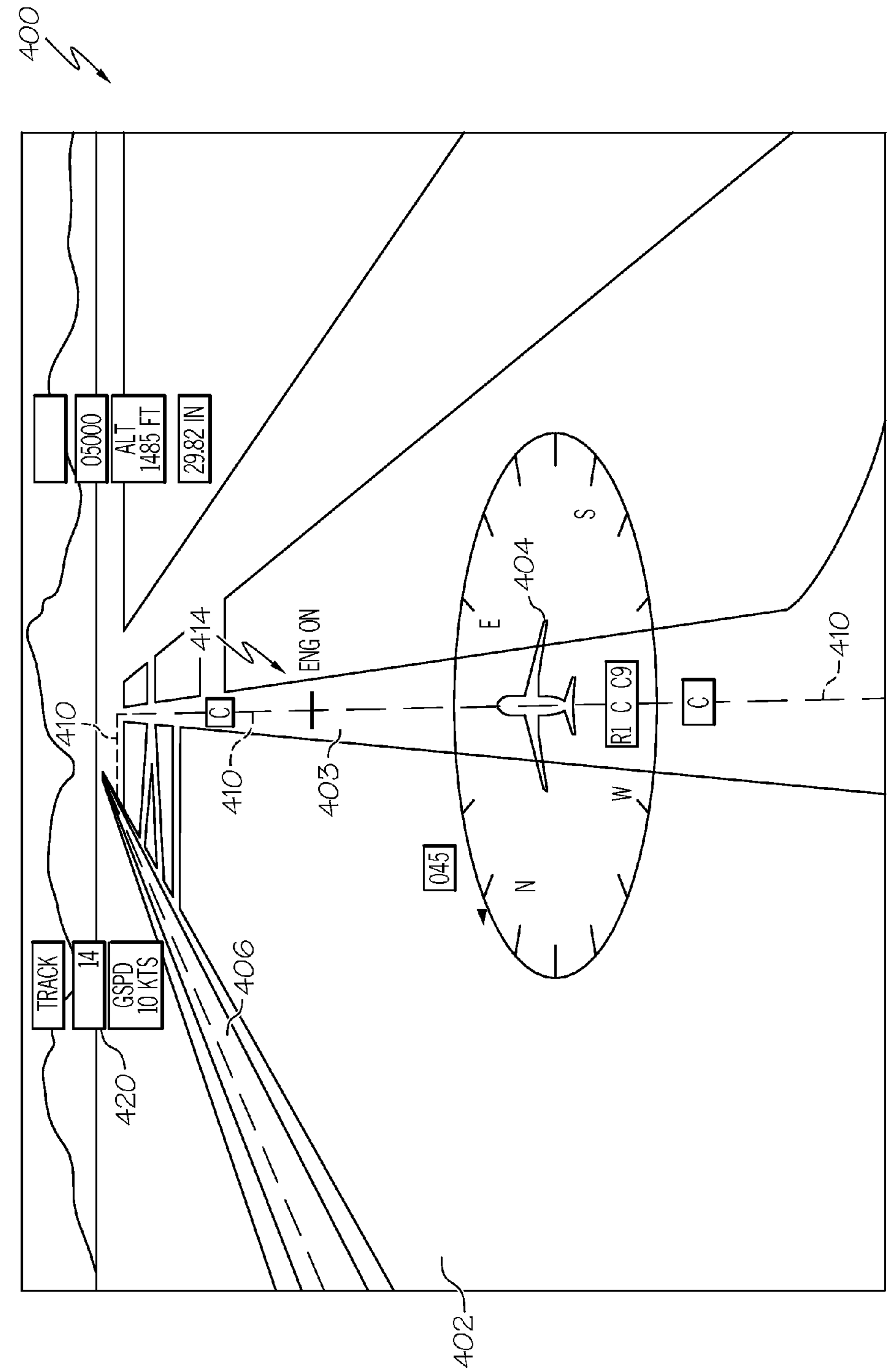
FIG. 4 is a graphical representation of a synthetic display having rendered thereon an airport field and electric taxi guidance information.

FIG. 4 is a graphical representation of a synthetic display 400 having rendered thereon an airport field 402 and electric taxi guidance information. The synthetic display 400 includes a graphical representation of at least one taxiway 403, which corresponds to the taxiway on which the host aircraft is currently traveling. Although not always required, the synthetic display 400 includes a graphical representation of the aircraft 404 located and headed in accordance with the true geographic position and heading of the actual host aircraft. The synthetic display 400 also includes graphical representations of various features, structures, fixtures, and/or elements associated with the airport field 402. For example, the synthetic display 400 includes graphical representations of other taxiways (shown without reference numbers) conformally rendered in accordance with their real-world counterpart taxiways. For this example, the synthetic display 400 also includes a graphical representation of a runway 406.

The synthetic display 400 conveys the taxi path guidance information in the form of a graphical representation of a taxi path 410. FIG. 4 depicts a departure scenario where the taxi path 410 leads to a takeoff runway. The taxi path 410 may be rendered in a visually distinguishable or highlighted manner that is easy to detect and recognize. As mentioned previously, the taxi path 410 may be updated or changed to reflect air traffic control commands, airfield traffic, or the like.

The synthetic display 400 also conveys the start/stop guidance information in the form of a graphical engine on indicator 414. The illustrated embodiment of the engine on indicator 414 includes a line or other mark on or near the taxi path 410, and a text field that reads "Eng On" to indicate that the pilot should turn the primary thrust engine(s) on when the aircraft reaches the identified point. Thus, the engine on indicator 414 indicates a calculated time to start the primary thrust engine(s) during a takeoff taxi operation. Consequently, the displayed position of the engine on indicator 414 may be influenced by the desired warm up time of the engines, the length of the taxiway, and the taxi speed of the aircraft. Ideally, the engine on indicator 414 identifies an engine start time that allows the primary thrust engines to sufficiently warm up prior to takeoff, while maximizing the amount of electric taxi time (to conserve fuel). In a post-landing taxi scenario, the start/stop guidance information may take the form of a graphical engine off indicator that indicates when to turn the primary thrust engine(s) off. In such a scenario, the engine off indicator indicates a calculated time to stop the primary thrust engine(s) during a post-landing taxi operation. Accordingly, the displayed position of an engine off indicator may be influenced by the desired cool down time of the engines, the length of the taxiway, and the taxi speed of the aircraft. In certain embodiments, the engine off indicator is generated only if the aircraft is on the ground, traveling less than a threshold speed, and the engines have been at idle for at least a designated cool down period of time. It should be appreciated that the start/stop guidance information could also include graphical indicia that indicates when to turn the electric taxi system on and off.

FIG. 4 depicts a moment in time when the aircraft is being driven by the electric taxi system. Accordingly, the synthetic display 400 also conveys the speed guidance information in the form of a graphical representation of a target electric taxi speed 420. For this example, the optimal electric taxi speed is 14 knots. As described above, the target electric taxi speed may be calculated in accordance with certain fuel consumption or conservation requirements, brake system lifespan specifications, or other optimization factors.

While at least one exemplary embodiment has been presented in the foregoing detailed description, it should be appreciated that a vast number of variations exist. For example, the techniques and methodologies presented here could also be deployed as part of a fully automated guidance system to allow the flight crew to monitor and visualize the execution of automated maneuvers. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A taxi guidance method for an aircraft having a primary thrust engine and an onboard electric taxi system, the method comprising:

obtaining aircraft status data for the aircraft;

accessing airport feature data associated with an airport field;

generating, in response to at least the aircraft status data and the airport feature data, start/stop guidance information for use during taxi, the start/stop guidance information based upon an engine cool down time period and an engine warm up time period of the primary thrust engine;

generating, in response to at least the aircraft status data, the airport feature data, and the start/stop guidance information, taxi path guidance information for the aircraft, the taxi path guidance information configured to conserve both of a fuel and an operating life of a brake system of the aircraft;

generating, in response to at least the aircraft status data and the airport feature data, speed guidance information for the onboard electric taxi system; and presenting the taxi path guidance information, the start/stop guidance information, and the speed guidance information to a user, wherein the presenting step comprises:

displaying a dynamic synthetic representation of the airport field on a display element; and displaying, in the dynamic synthetic representation of the airport field and proximate to the graphical representation of the taxi path, a graphical engine on indicator or a graphical engine off indicator corresponding to the start/stop guidance information.

2. The method of claim 1, further comprising acquiring user-selected data, wherein the generated taxi path guidance information is influenced by the user-selected data.

3. The method of claim 1, further comprising acquiring user-selected data, wherein the generated start/stop guidance information is influenced by the user-selected data.

4. The method of claim 1, further comprising acquiring user-selected data, wherein the generated speed guidance information is influenced by the user-selected data.

5. The method of claim 1, wherein the start/stop guidance information comprises an engine on indicator that indicates a calculated time to start the primary thrust engine during a taxi to takeoff operation.

6. The method of claim 1, wherein the start/stop guidance information comprises an engine off indicator that indicates a calculated time to stop the primary thrust engine during a post-landing taxi operation.

7. The method of claim 1, wherein presenting the taxi path guidance information, the start/stop guidance information, and the speed guidance information on the display element further comprises:

displaying, in the dynamic synthetic representation of the airport field, a graphical representation of a taxi path corresponding to the taxi path guidance information; and displaying, in the dynamic synthetic representation of the airport field, a target electric taxi speed corresponding to the speed guidance information.

8. A method of displaying taxi guidance indicia for an aircraft having a primary thrust engine and an onboard electric taxi system, the method comprising:

obtaining aircraft status data including geographic position data and heading data for the aircraft;

accessing airport feature data associated with synthetic graphical representations of an airport field;

generating, in response to at least the aircraft status data and the airport feature data, taxi path guidance information for the aircraft, start/stop guidance information based upon a warm up time of the of the primary thrust engine and a cool down time of the primary thrust engine, and speed guidance information for the onboard electric taxi system, the start/stop guidance information configured to conserve both of a fuel and an operating life of a brake system of the aircraft;

rendering a dynamic synthetic representation of the airport field on a display element, the dynamic synthetic representation being rendered in accordance with the geographic position data, the heading data, and the airport feature data, wherein the dynamic synthetic representation of the airport field comprises graphical indicia of the taxi path guidance information, the start/stop guidance information, and the speed guidance information; and displaying, in the dynamic synthetic representation of the airport field and proximate to the graphical indicia of a taxi path, a graphical engine on indicator or a graphical engine off indicator corresponding to the start/stop guidance information.

9. The method of claim 8, further comprising acquiring user-selected data, wherein the generated taxi path guidance information, the generated start/stop guidance information, and the generated speed guidance information are influenced by the user-selected data.

10. The method of claim 8, further comprising acquiring neighboring aircraft status data for at least one neighboring aircraft in the airport field, wherein the generated taxi path guidance information, the generated start/stop guidance information, and the generated speed guidance information are influenced by the neighboring aircraft data.

11. The method of claim 8, further comprising acquiring air traffic control data, wherein the generated taxi path guidance information, the generated start/stop guidance information, and the generated speed guidance information are influenced by the air traffic control data.

12. The method of claim 8, wherein the taxi path guidance information, the start/stop guidance information, and the speed guidance information are generated in accordance with a fuel conservation specification of the aircraft.

13. The method of claim 8, wherein the taxi path guidance information, the start/stop guidance information, and the speed guidance information are generated in accordance with an operating life longevity specification of a brake system of the aircraft.

14. The method of claim 8, wherein the graphical indicia of the start/stop guidance information comprises an engine on indicator that indicates a calculated time to start the primary thrust engine during a taxi to takeoff operation.

15. The method of claim 8, wherein the graphical indicia of the start/stop guidance information comprises an engine off indicator that indicates a calculated time to stop the primary thrust engine during a post-landing taxi operation.

16. A taxi guidance system for an aircraft having a primary thrust engine and an onboard electric taxi system, the system comprising:

a source of aircraft status data for the aircraft;

a source of airport feature data associated with synthetic graphical representations of an airport field;

a processor operatively coupled to the source of aircraft status data and to the source of airport feature data to generate, in response to at least the aircraft status data and the airport feature data, taxi path guidance information for the aircraft, start/stop guidance information based upon a warm up time of the primary thrust engine and a cool down time of the primary thrust engine, the start/stop guidance information configured to conserve both of a fuel and an operating life of a brake system of the aircraft, and speed guidance information for the onboard electric taxi system, and to generate image rendering display commands; and a display element that receives the image rendering display commands and, in response thereto, renders a dynamic synthetic representation of the airport field that includes graphical indicia of the taxi path guidance information, the start/stop guidance information, and the speed guidance information, wherein the start/stop guidance information comprises a graphical engine on indicator or a graphical engine off indicator rendered in the dynamic synthetic representation of the airport field and proximate to the graphical representation of a taxi path.

17. The system of claim 16, wherein the display element is a flight deck display onboard the aircraft.

18. The system of claim 16, wherein the display element is a display of an electronic flight bag.

* * * * *